Oct. 4, 1955
C. F. PARROTT
2,719,753
PORTABLE SPRAYING APPARATUS
Filed Aug. 31, 1954
2 Sheets-Sheet 2
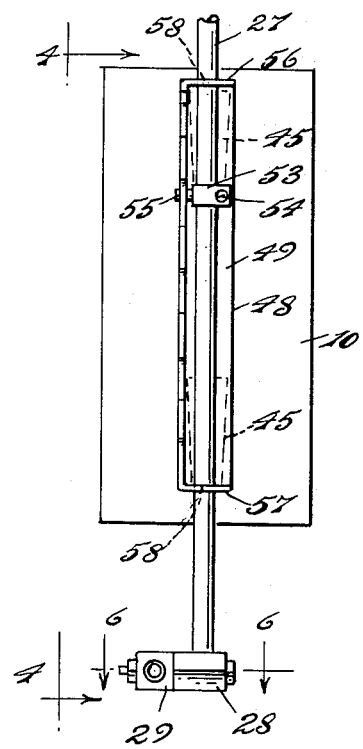
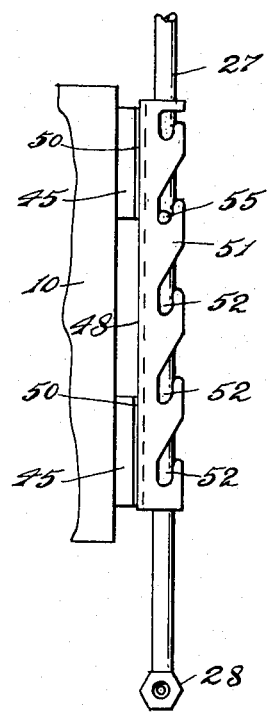
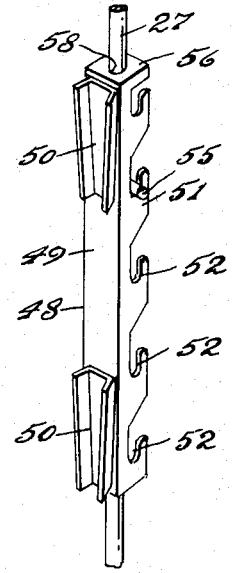
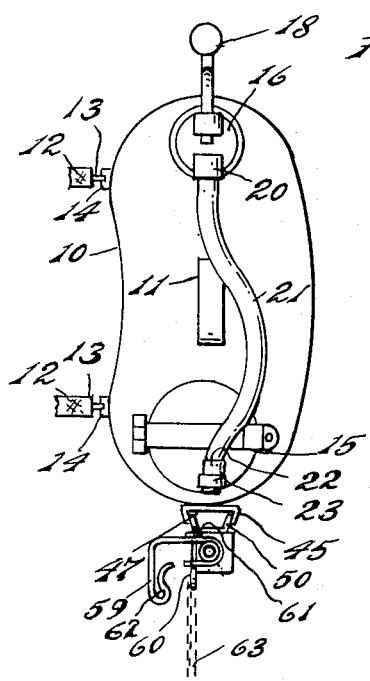
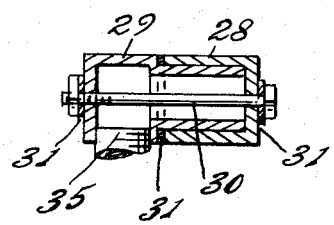
INVENTOR
*Clarence F. Parrott*
BY
*B. T. Wolvensmith*
ATTORNEY.

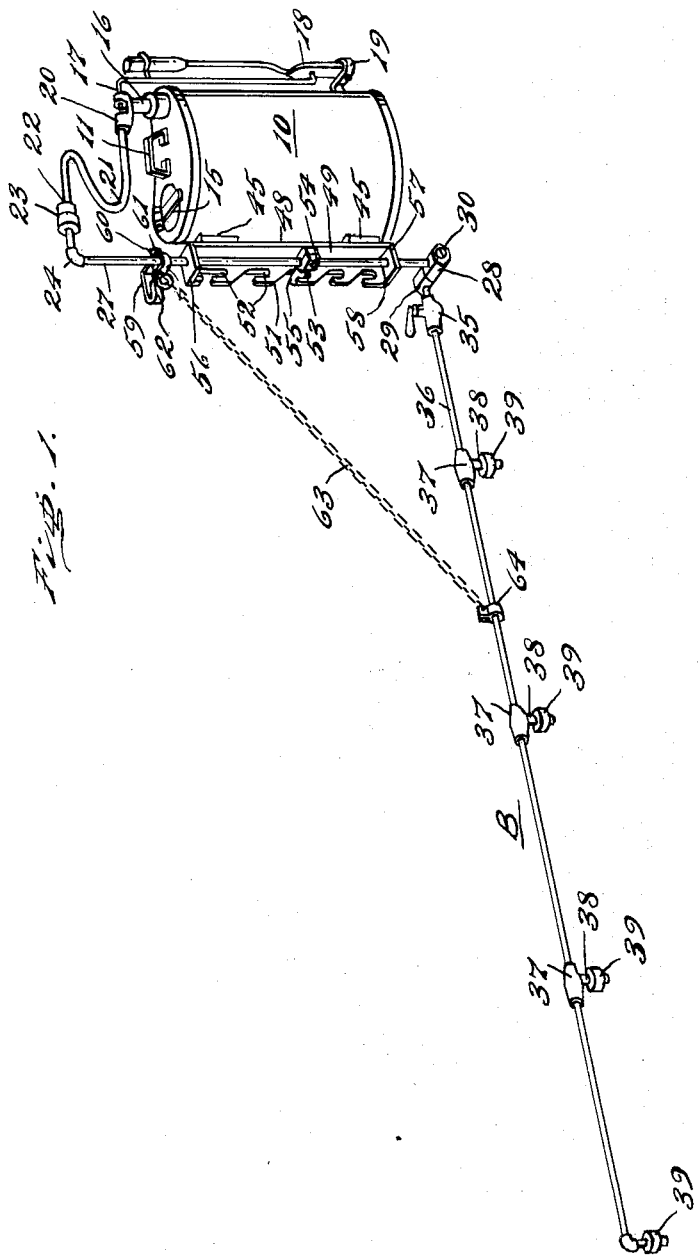

United States Patent Office 2,719,753
Patented Oct. 4, 1955

2,719,753
PORTABLE SPRAYING APPARATUS

Clarence F. Parrott, Pennsburg, Pa., assignor to Parco Products Company, Pennsburg, Pa., a copartnership Application August 31, 1954, Serial No. 453,272

5 Claims. (Cl. 299—96)

This invention relates to portable spraying apparatus of the knapsack type.

In my prior application Serial No. 342,777, now Patent No. 2,692,799, there is disclosed portable spraying apparatus for simultaneous spraying of a plurality of rows of growing crops with the spraying for each row directed, if desired, from a plurality of directions.

The present invention is directed to apparatus for the same and similar purposes as that shown in my prior application, but contemplates an improved character of simplified and adjustable support for the spray nozzle pipe.

The present invention is further directed to portable spraying apparatus in which the spray nozzle pipe, and accordingly the nozzles carried thereby, can be positioned at any one of a number of horizontal locations in accordance with the desires and requirements of the user.

Other objects and advantageous features of the invention will be apparent from the specification and claims.

The nature and characteristic features of the invention will be more readily understood from the following description, taken in connection with the accompanying drawings forming part thereof, in which;

Figure 1 is a view in perspective showing the spraying apparatus of the present invention in position for use;

Fig. 2 is a top plan view of the tank, part of the boom being broken away;

Fig. 3 is a side elevational view of the boom support;

Fig. 4 is a vertical sectional view taken approximately on the line 4—4 of Fig. 3;

Fig. 5 is a perspective view of the boom support removed from the tank; and

Fig. 6 is a horizontal sectional view taken approximately on the line 6—6 of Fig. 3.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the portable spraying apparatus, in accordance with the present invention, preferably includes a liquid container or tank 10, of suitable size and preferably made of metal. The container 10 is provided with a handle 11 secured to the top portion thereof, and adjustable straps 12, of suitable textile material, having a plurality of hooks 13 at the ends thereof for removable engagement with brackets 14 on each side of the container 10, so that the container 10 can be carried on the back of the user with the straps 12 bearing on the shoulders of the user.

The container 10 is provided in the top wall thereof with a fluid tight closure 15, of any preferred type, for filling the container 10. The container 10 is also provided in the interior thereof with a pump, the piston 16 of which is engaged by a rod 17. The lower end of the rod 17 is pivotally connected to a manually operable pump lever 18, the lever 18 being pivotally connected to a bracket 19 secured to the tank 10.

At one side of the top of the piston 16, a short tube 20 is provided to which a hose 21, preferably of rubber or similar flexible material, is connected. The opposite end of the hose 21 is secured by a clamp 22 to a separable quick-locking union 23.

The structure heretofore described is well known in the portable tank field.

The union 23 is connected to an elbow 24 which has, in threaded engagement therewith, an elongated vertical pipe 27. The pipe 27, at its lower end is connected to a hollow block 28 which faces outwardly from the tank 10 and is aligned with a hollow block 29 which has a portion extending into the block 28. A connector 30 holds the blocks 28 and 29 in pivotal relation and washers 31 prevent fluid leaking.

The block 29 has a petcock 35 threaded thereinto for controlling the fluid flow and an elongated pipe section 36 forming the main portion of a boom B is threaded into the petcock 35.

The pipe section 36 is preferably made of a lightweight material, such as aluminum. The pipe section 36, at a plurality of spaced locations, is provided with connectors 37 for the connection of branch pipes 38, of the desired length, the pipes 38 having adjustably mounted divergently spraying nozzles 39 thereon.

Vertically spaced brackets 45 are provided on the tank 10 each having a downwardly and outwardly converging or V-shaped socket 47.

A supporting frame 48 is provided, having a vertical wall portion 49 to which V-shaped mounting members 50, complemental to the sockets 47, are secured, and a vertical wall 51 which is provided with a plurality of inwardly and downwardly extending sockets 52.

The pipe 27 has a clamp 53 adjustably secured thereto and held in adjusted position by a screw 54, the clamp 53 having an outwardly projecting finger 55 for reception in a selected one of the sockets 52.

The frame 48 also has upper and lower end walls 56 and 57 with openings 58 therethrough through which the pipe 27 is readily movable, the total extent of movement being limited by the clamp 53 which serves as a stop.

The pipe 27 is provided, near the upper part thereof, with a bracket 59, held in position by an eyebolt 60 and lock nuts 61. The bracket 59 has a U-shaped portion 62 for the reception and retention of the pipe section 36 when it is moved to a vertical position. A boom supporting chain 63 may also be provided, for holding the pipe section 36 in a horizontal position, extending from the eyebolt 60 to a clamp 64 on the pipe section 36.

The mode of operation will now be pointed out.

The tank 10 having the spraying fluid therein is positioned on the back of the user and held by the straps 12.

The boom B can be attached to the tank 10 at any time before spraying is commenced but is preferably assembled before the tank 10 is positioned on the back of the user.

When not in use the pipe section 36 of the boom B is preferably pivoted into a vertical position by a simple manual operation and held in place in the U-shaped portion 62 of the bracket 59.

To prepare for spraying the boom B is disengaged from the portion 62 and swung downwardly into a generally horizontal position where it is supported by the chain 63, and the petcock 35 is turned to its open position.

The pump piston 16 is operated by the pump lever 18 to maintain the desired pressure in the tank 10 required for spraying. The spray nozzles 39 are positioned in accordance with the particular spacing of the rows of plants to be sprayed and at angles to deliver the spray from above or below the plants as desired.

The horizontal position of the boom B may be readily adjusted as desired, by turning the pipe 27 and lowering it with the finger 55 positioned in a selected socket 52 which gives the desired height adjustment. If a still finer adjustment of height is desired this may be effected by loosening the screw 54, moving the clamp 53 along the pipe 27 the desired extent, and then positioning the finger 55 in the desired socket 52.

Upon the completion of the spraying the boom B can be raised vertically and moved into position to be held by the portion 62.

Upon the completion of the spraying, or if it is desired to make changes in the length or adjustment of the boom B or any of its parts, the petcock 35 can be shut off.

I claim:

1. In portable spraying apparatus for a spray container of the back carry type having internal pressure developing means, the combination comprising a supporting member detachably mounted on a side wall portion of the container, a vertical tubular fluid delivery member carried by said supporting member and movable to a position with a part thereof projecting below said container, a fluid connection from said vertical tube to the interior of said container, a spray distributing tube connected at one end to said vertical tubular member, a plurality of spray dispensing arms connected to said distributing tube, and adjustable means for positioning said tubular member with respect to said supporting member, said last means including a part carried by one of said members having a plurality of vertically spaced sockets and a part carried by the other of said members having a finger for selective engagement in one of said sockets.

2. In portable spraying apparatus for a spray container of the back carry type having internal pressure developing means, the combination comprising a supporting member detachably mounted on a side wall portion of the container, a vertical tubular fluid delivery member carried by said supporting member and movable to a position with a part thereof projecting below said container, a fluid connection from said vertical tubular member to the interior of said container, a spray distributing tube connected at one end to said vertical tubular member, a plurality of spray dispensing arms connected to said distributing tube, and adjustable means for positioning said tubular member with respect to said supporting member, said last means including a part carried by said supporting member having a plurality of vertically spaced sockets and a part carried by said tubular member having a finger for selective engagement in one of said sockets.

3. Portable spraying apparatus as defined in claim 2 in which the part carried by the tubular member has a portion for adjustably securing said part to the tubular member.

4. In portable spraying apparatus for a spray container of the back carry type having internal pressure developing means, the combination comprising a supporting member detachably mounted on a side wall portion of the container, said supporting member having a vertical side wall portion, a vertical tubular fluid delivery member carried by said supporting member and movable to a position with a part thereof projecting below said container, a fluid connection from said tubular member to the interior of said container, a spray distributing tube pivotally connected at one end to said tubular member, a plurality of spray dispensing arms connected to said distributing tube, and adjustable means for positioning said tubular member with respect to said supporting member, said last means including a part carried by said vertical side wall portion having a plurality of vertically spaced sockets and a part carried by the said delivery member having a finger adjustably secured thereto for selective engagement in one of said sockets.

5. In a portable spraying apparatus for a spray container of the back carry type having internal pressure developing means, the combination comprising a supporting member, said supporting member having vertical side wall portions and horizontal end wall portions, one of said side wall portions having members for detachably mounting said supporting member on a side wall portion of the container, a vertical tubular fluid delivery member extending through said end wall portions and movable to a position with a part thereof projecting below said container, a fluid connection from said tubular member to the interior of said container, a spray distributing tube pivotally connected at one end to said tubular member, a plurality of spray dispensing arms connected to said distributing tube, and adjustable means for positioning said tubular member with respect to said supporting member, said last means including a part carried by one of said vertical side wall portions having a plurality of vertically spaced sockets and a part carried by the said delivery member having a finger adjustably secured thereto for selective engagement in one of said sockets.

References Cited in the file of this patent

UNITED STATES PATENTS

| | | |
|---|---|---|
| 912,966 | Lamiell | Feb. 16, 1909 |
| 2,110,027 | Santarelli | Mar. 1, 1938 |